United States Patent [19]
Dahl

[11] Patent Number: 4,834,249
[45] Date of Patent: May 30, 1989

[54] OSCILLATION SUPPRESSOR FOR SELF-LEVELING BOOM

[75] Inventor: Dennis A. Dahl, Lincoln, N. Dak.

[73] Assignee: Clark Equipment Company, South Bend, Ind.

[21] Appl. No.: 47,195

[22] Filed: May 7, 1987

[51] Int. Cl.$^4$ .............................................. B05B 1/20
[52] U.S. Cl. .................................... 212/266; 239/172; 239/175
[58] Field of Search ............... 212/195, 222, 223, 255, 212/266, 271, 267, 189; 239/166, 169, 172, 175

[56] References Cited

U.S. PATENT DOCUMENTS

| | | |
|---|---|---|
| 999,076 | 7/1911 | Willis . |
| 1,382,731 | 6/1921 | Kinney . |
| 2,342,120 | 2/1944 | Cartwright . |
| 2,532,996 | 12/1950 | Clark et al. . |
| 2,584,484 | 2/1952 | McIntosh . |
| 2,602,684 | 7/1952 | Pinke . |
| 2,628,128 | 2/1953 | Rhodeen . |
| 2,655,405 | 10/1953 | Lattner . |
| 2,684,865 | 7/1954 | Lattner . |
| 2,690,355 | 9/1954 | Waters et al. . |
| 2,725,256 | 11/1955 | Devost et al. . |
| 2,781,229 | 2/1957 | Thornburg . |
| 3,001,720 | 9/1961 | Cartwright . |
| 3,086,713 | 4/1963 | Moldenhauer . |
| 3,117,725 | 10/1964 | Palmer ...................... 239/169 |
| 3,147,925 | 9/1964 | Compton et al. . |
| 3,158,324 | 11/1964 | Oehler et al. . |
| 3,223,330 | 12/1965 | Plante . |
| 3,284,006 | 11/1966 | Cartwright . |
| 3,301,487 | 1/1967 | Young . |
| 3,395,503 | 8/1968 | Greenburg et al. . |
| 3,545,678 | 12/1970 | Tangeman .................... 239/169 |
| 3,580,505 | 5/1971 | Loeffler . |
| 3,857,515 | 12/1974 | Zennie ......................... 239/175 |
| 3,887,132 | 6/1975 | Widmer . |
| 3,927,832 | 12/1975 | Robison et al. ................. 239/168 |
| 4,106,700 | 8/1978 | Clark . |
| 4,197,999 | 4/1980 | Lammers . |
| 4,200,255 | 4/1980 | Schmidt et al. . |
| 4,221,353 | 9/1980 | Kuhn et al. . |
| 4,344,572 | 8/1982 | Tyler . |
| 4,372,492 | 2/1983 | Blumenshine . |
| 4,449,667 | 5/1984 | Tyler . |
| 4,569,486 | 2/1986 | Baumer ......................... 239/166 |

OTHER PUBLICATIONS

Dakota Products, Inc., brochure entitled "Dakota Sprayer", 1 page.
Summers Manufacturing Co., Inc., brochure entitled "Summers Skid Mounted Agri–Sprayer", 2 pages, (GA—1641—284—5MP).
Vicon, Inc., brochure entitled "Making The Most of Your Chemical and Your Crop", 10 pages.
Alloway, a subsidiary of Rau, brochure entitled "Pickup Sprayer", (2 pages), (GA—1787—286—5MJ).
Alloway, a Subsidiary of Rau, brochure entitled "Trailer Sprayer", 2 pages, (GA—1599—1183—5MP).
Alloway, a Subsidiary of Rau, brochure entitled "Pickup Sprayer", 2 pages, (GA—1611—1283—5MP).
Hardi, Inc., brochure entitled "Truck Mount Sprayers", 4 pages.
Lindseth Manufacturing Co., Inc., brochure entitled "Sprayer For The 80'S", 3 pages.

*Primary Examiner*—Sherman D. Basinger
*Assistant Examiner*—Stephen P. Avila
*Attorney, Agent, or Firm*—Kinney & Lange

[57] ABSTRACT

In a vehicle provided with a boom assembly that extends laterally therefrom during use, a self-leveling mount for said assembly employs a swinging linkage having dampening device incorporated into the pivotal connections of the linkage to suppress side-to-side oscillation of the boom. Each such device includes a tubular member arranged on a fore-and-aft axis of the vehicle, an axle in the member movable with an associated leg of the linkage, a resilient bushing in the member around the axle, and means subjecting the bushing to axial compression to force the bushing radially outwardly and inwardly into frictional engagement with the inner surface of the member and an outer surface of the axle it surrounds. Compression of the bushing is caused by force against pressure elements in the form of washers that bear against the ends of the bushing, thereby eliminating the need for oil-filled shock absorbers or other costly components to suppress boom oscillation.

14 Claims, 4 Drawing Sheets

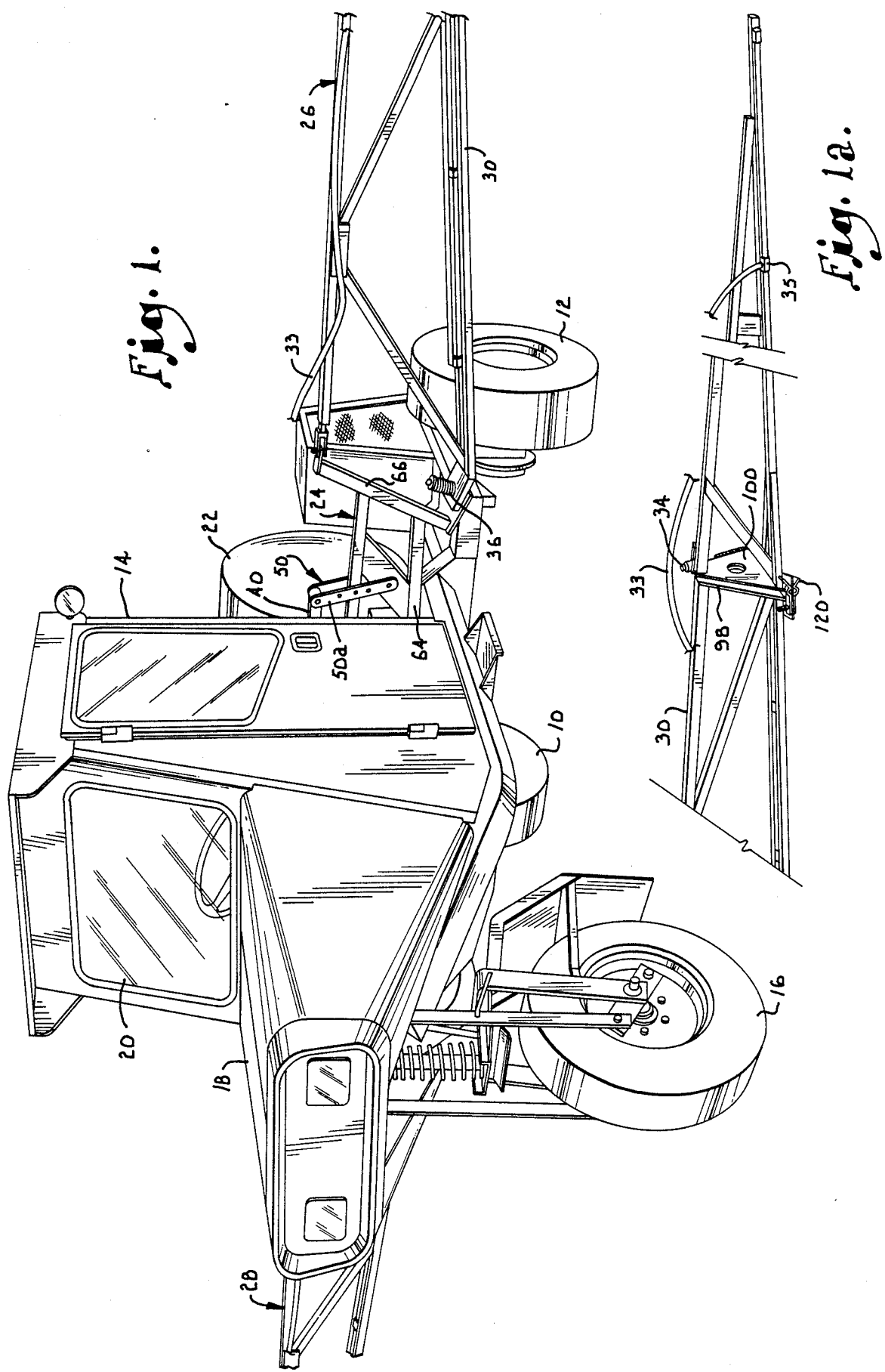

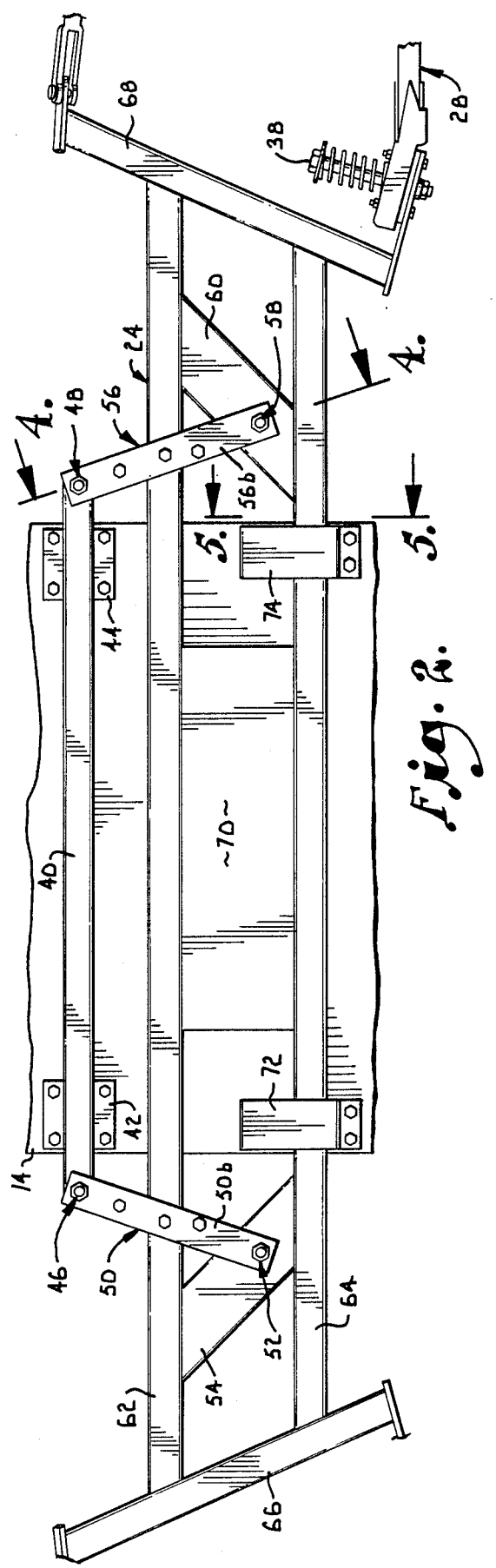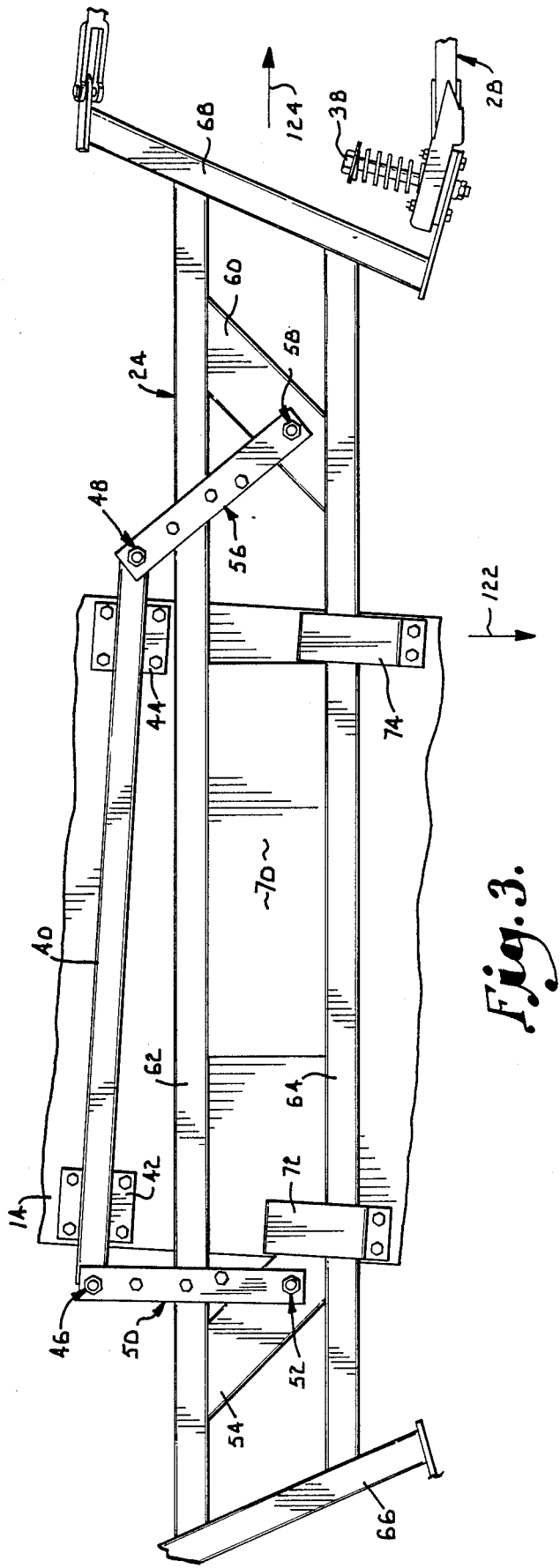

OSCILLATION SUPPRESSOR FOR SELF-LEVELING BOOM

This invention relates to self-leveling boom assemblies for agricultural field sprayers and, more particularly, to a mount for such assemblies which incorporates means for suppressing lateral oscillation of the boom as the propelling vehicle traverses uneven terrain.

Agricultural spray vehicles of various configurations are employed to spray herbicides, insecticides, fertilizers and the like onto a crop from a boom extending laterally from both sides of the vehicle and supported in a working position. Due to the oftentimes uneven nature of the terrain to be traversed, self-leveling mounts may be employed to compensate for vertical and rotational movement of the spray vehicle to maintain the boom at a substantially horizontal working attitude. One such self-leveling mount is in the nature of an "A" linkage which isolates the boom from sprayer frame movement and is effective in minimizing the variation in boom height caused by rough terrain.

However, in operation the "A" linkage mount induces lateral movement in the boom in response to rotation of the sprayer frame; therefore, some means is desirably employed to minimize excessive side-to-side movement of the boom as it continuously adjusts to a level attitude during motion of the vehicle. Dampening may be effected by the use of shock absorbers but with the attendant disadvantage of cost and mechanical complexity.

It is, therefore, the primary object of the present invention to provide a simple and yet effective means of suppressing the side-to-side oscillation of self-leveling booms and, in particular, to provide dampening devices that are incorporated into a self-leveling mount of the "A" linkage type.

It is also an important object of this invention to provide dampening devices as aforesaid which are employed at the pivotal connections of the boom-supporting linkage, and which do not require the utilization of oil-filled shock absorbers or similar apparatus to suppress boom oscillation.

Still another important object of the invention is to provide such a dampening device that employs a resilient bushing in axial compression, arranged to apply radially outwardly and inwardly directed frictional forces at a pivotal connection.

Yet another important object is to provide a pivotal connection in a boom-supporting linkage as aforesaid, wherein the bushing at the connection is compressed between an interior axle and a surrounding tubular member in order to suppress oscillation of a hanger leg that induces rotation of the axle in response to side-to-side shifting of the boom.

Other objects will become apparent as the detailed specification proceeds.

DESCRIPTION OF THE DRAWINGS

FIG. 1 is a frontal perspective view of a self-propelled agricultural field sprayer incorporating the improvements of the present invention, the sprayer boom being fragmentarily shown laterally extended to its working position.

FIG. 1a illustrates the remainder of the boom on the right side of the vehicle as viewed in FIG. 1.

FIG. 2 is an enlarged, fragmentary, rear elevation of the cab of the vehicle of FIG. 1 showing both the cab and the boom assembly in a horizontal attitude.

FIG. 3 is a view similar to FIG. 2 but illustrates clockwise rotation of the cab and corresponding movement of the hanger legs and boom to maintain a level position.

DETAILED DESCRIPTION

Figure 4:
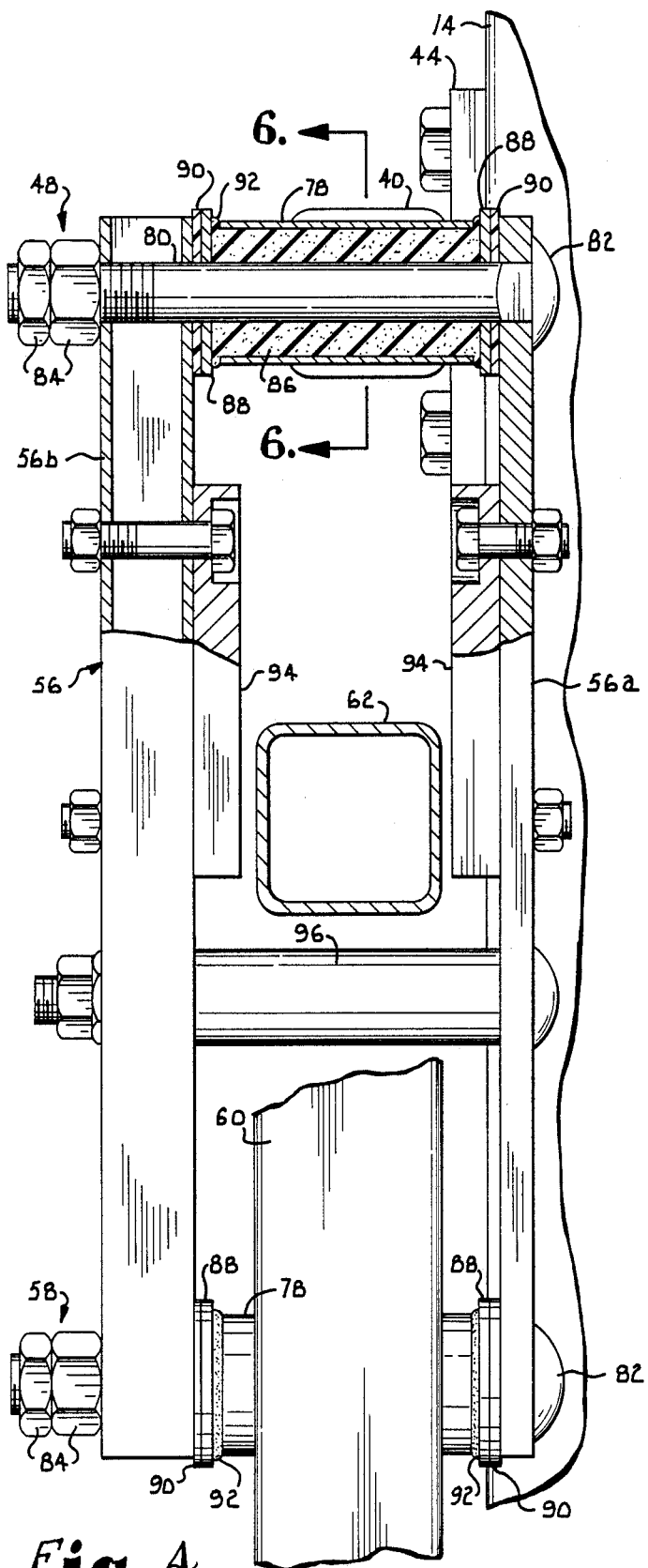
FIG. 4 is a greatly enlarged, cross-sectional view taken along line 4—4 of FIG. 2, the interior of one of the dampening devices being broken away and revealed in longitudinal cross-section.

A representative type of agricultural spray vehicle is shown in FIGS. 1 and 1a. The vehicle illustrated is self-propelled and has two driven rear wheels 10 and 12. A cab 14 for the operator is located approximately midway between the front and rear ends of the vehicle frame. A steerable nose wheel 16 is mounted beneath a tapered hood 18 that projects forwardly from beneath the windshield 20 of the cab, the hood 18 in the illustrated design being primarily aesthetic rather than functional in that the engine and transmission are mounted behind the liquid tank 22.

A sprayer boom assembly is mounted on the rear wall of the cab 14 and includes a center portion broadly denoted 24, a left wing 26 and a right wing 28, the left and right directions being as one would view the equipment from the rear looking to the front generally along the fore-and-aft axis of the vehicle. The left and right boom wings 26 and 28 are shown (fragmentarily) fully extended in FIG. 1, wing 26 being continued in FIG. 1a where it may be seen that it comprises an inner section 30 and an outer section 32 interconnected by a hinge 34. A flexible conduit 33 extends to spray nozzles 35.

The inner end of the inner boom section 30 is connected to the center section 24 by a main pivot hinge 36 seen in FIG. 1 which defines an inclined pivot axis such that the weight of the boom wing 26 causes it to seek an extended position orthogonal to the fore-and-aft axis of the vehicle. A spring detent lock (not shown in detail) is incorporated into the main pivot hinge 36 to hold the boom wing 26 in the extended position illustrated during operation. The same arrangement is employed with the right boom wing 28 as may be seen in FIGS. 2 and 3 which reveal an inclined, main pivot hinge 38 securing the inner end of the right boom wing 28 to the center portion 24 of the boom assembly.

Referring particularly to FIGS. 2 and 3, a self-leveling mount in the nature of an "A" linkage is shown in detail. It should be appreciated that the center portion 24 of the boom assembly is mounted just behind the cab 14 in a clearance space provided between the cab and the tank 22 therebehind. A horizontal support bar 40 is welded to left and right bracket plates 42 and 44 which are bolted to the rear wall of the cab 14. The ends of the support bar 40 project laterally beyond the sidewalls of the cab 14 and are provided with left and right pivotal connections broadly denoted 46 and 48 respectively. A left hanger leg 50 depends from connection 46 and is attached at its lower end by a pivotal connection 52 to a cross piece 54 of center portion 24. Likewise, a right hanger leg 56 depends from the right end of support bar 40 at connection 48 and is attached at its lower end by a pivotal connection 58 to a cross piece 60 of center portion 24. The cross pieces 54 and 60 interconnect a pair of horizontally-extending, upper and lower center boom members 62 and 64 which terminate at left and right inclined posts 66 and 68 that carry the left and right main pivot hinges 36 and 38 respectively. The two horizontal boom members 62 and 64 are further interconnected by a center plate 70 shown shifted to the right in FIG. 3 to the right-hand limit of movement of center portion 24. Left and right brackets 72 and 74 are bolted to the rear wall of cab 14 below bracket plates 42 and 44, and serve to provide left and right stops engageable by the corresponding end of plate 70.

Figure 5:
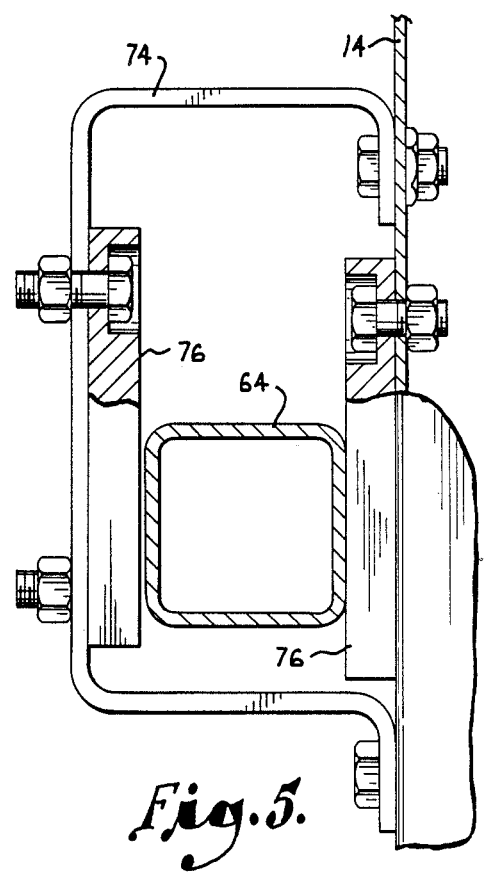
FIG. 5 is a cross-sectional view taken along line 5—5 of FIG. 2, on the same scale as FIG. 4.

In FIG. 3 the right end of plate 70 is in engagement with bracket 74. Bracket 74 is shown in detail in FIG. 5 receiving boom member 64 between a pair of opposed wear plates 76. The left bracket 72 is of identical construction; accordingly, the two lower brackets 72 and 74 also serve as guides for the laterally shiftable boom assembly.

Figure 6:
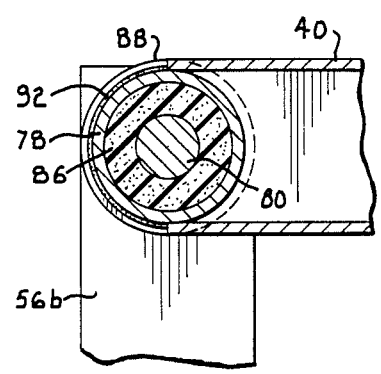
FIG. 6 is a cross-sectional view taken along line 6—6 of FIG. 4.

Referring particularly to FIGS. 4 and 6, the upper and lower pivotal connections 48 and 58 at the right side of the center portion 24 of the boom assembly are shown in detail. The construction utilized for upper and lower pivotal connections 46 and 52 at the left side of center portion 24 are identical thereto and thus are not shown in detail. With reference to the upper connection 48, a cylindrical metal sleeve 78 is welded to the right end of support bar 40 and is disposed such that its axis extends fore and aft of the vehicle or at a right angle with respect to the laterally-extended, working position of the boom assembly. The hanger leg 56 is a two-piece construction, being formed by a front leg component 56a and a rear leg component 56b. In the illustrated embodiment, the front leg component 56a is composed of flat metal stock whereas tubular stock is utilized for the rear component 56b. Both are apertured at their upper ends to receive a carriage bolt 80 having a head 82 with flats in complemental engagement with front component 56a. The shank of carriage bolt 80 presents an axle for the hanger leg 56 extending coaxially through the sleeve 78, the rearwardly projecting, threaded end of the shank 80 having nuts 84 thereon. A resilient rubber bushing 86 surrounds the shank of the carriage bolt within the sleeve 78 and fills the annular space defined by the outer surface of the shank and the inner surface of the sleeve.

A pair of metal washers 88 adjacent the respective ends of the sleeve 78 function as pressure elements engaging the opposed ends of the bushing 86. Nylon washers 90 are sandwiched between the metal washers 88 and the facing surfaces of the leg components 56a and 56b respectively. In assembly the nuts 84 are tightened sufficiently to subject the bushing 86 to axial compression to cause the ends of the bushing to expand or bulge and present an expanded annulus 92 at each end of the bushing at its zone of contact with the adjacent metal washer 88. In this respect it should be understood that the length of the bushing 86 is greater than the length of the surrounding tubular member 78 such that the excess length forms the expanded annuluses 92 to preclude contact of the circular end surfaces of the tubular member 78 with the metal washers 88. The preferred composition of resilient bushing 86 is BUNA N, 65-75 durometer, shore A hardness.

A pair of opposed wear plates 94 are mounted on the facing inner surfaces of the leg components 56a and 56b adjacent the upper boom member 62. These wear plates 94 and the plates 76 in bracket 74 (FIG. 5) limit front-to-rear movement of the boom such as could occur when the outer section of a boom wing breaks back at its hinge (such as hinge 34, FIG. 1a) upon striking an obstacle.

A spacer 96 interconnects the two leg components 56a and 56b beneath the boom member 62. The pivotal connection 58 at the lower end of the leg components 56a and 56b is identical in construction to that described above with respect to the upper connection 48. Therefore, identical reference numerals are applied to the corresponding components.

Figure 7:
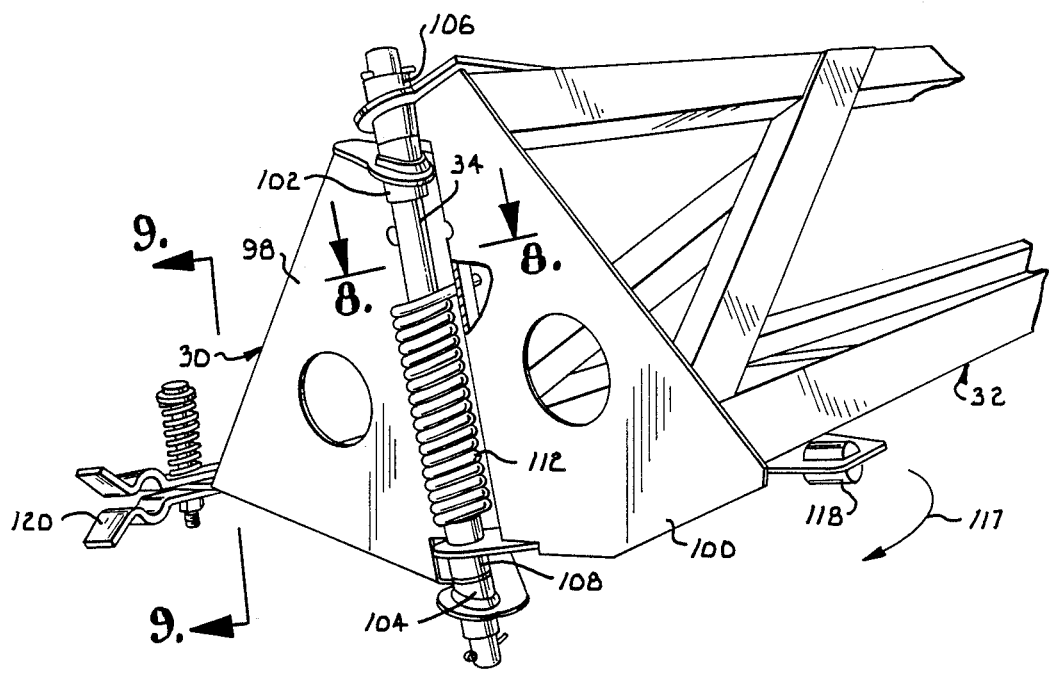
FIG. 7 is a detail view of the hinge joint between the inner and outer boom sections, showing the sections folded and revealing a return spring at the joint.
Figure 8:
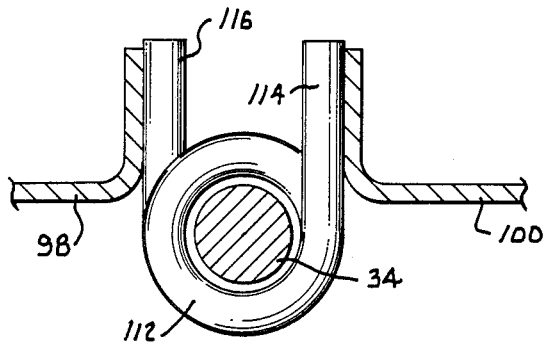
FIG. 8 is an enlarged, cross-sectional view taken along line 8—8 of FIG. 7.
Figure 9:
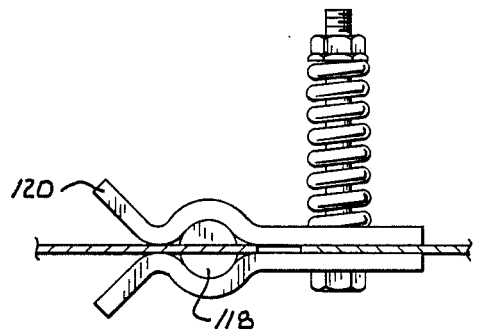
FIG. 9 is a detail view taken generally along line 9—9 of FIG. 7 and showing the means for releasably locking the inner and outer sections in the fully extended position.

Referring to FIGS. 7-9, the outer end of the inner section 30 of boom wing 26 terminates at a plate 98 of generally triangular configuration. Likewise, the inner end of the outer section 32 is defined by a generally triangular plate 100. The hinge 34 comprises a pin received by cylindrical hinge parts 102 and 104 carried by the plate 98, and 106 and 108 carried by the plate 100. A torsion return spring 112 is coiled around the hinge pin 34, and has upper and lower ends 114 and 116 bearing against plates 100 and 98, respectively, as is clear in FIG. 8. Accordingly, spring 112 continuously biases the inner and outer boom sections 30 and 32 in the direction of the arrow 117 toward the extended position of outer section 32 where plates 98 and 100 are closed into parallelism with each other (FIG. 1a) with detent 118 on outer section 32 received within spring-loaded jaws 120 carried by inner section 30 (FIG. 9). If an obstacle is encountered by the outer section 32, the detent 118 is withdrawn from the jaws 120 and the outer section swings rearwardly against the action of the return spring 112.

OPERATION

FIG. 2 shows the cab 14 of the vehicle in a horizontal attitude as viewed in a plane orthogonal to the direction of travel of the vehicle. In FIG. 3 the vehicle frame has undergone a clockwise rotation as compared with FIG. 2 as evidenced by the rotated position of the cab 14 as could occur, for example, when the right rear wheel 10 (FIG. 1) encounters a depression in the terrain as illustrated by the downwardly directed arrow 122. By virtue of the self-leveling action of the mount, the hanger legs 50 and 56 swing to the right (counter-clockwise about pivotal connections 46 and 48) and thus the entire boom assembly shifts to the right as indicated by the arrow 124. However, a comparison of FIGS. 2 and 3 reveals that the center portion 24, and thus the entire boom assembly, has been maintained in a horizontal attitude by the action of the self-leveling mount.

Assuming now that the vehicle returns to a level position (no roll) as in FIG. 2, the boom assembly will shift leftwardly but, unless impeded, will overshoot the level position as it swings to the left on pivotal connections 46, 48, 52 and 58. Unless dampened, the boom will undesirably oscillate as it seeks the level position. In practice, this is further aggravated by additional changes in the attitude of the vehicle as it traverses uneven terrain typical of an agricultural field.

The dampening devices of the present invention illustrated in detail in FIGS. 4 and 6 effectively dissipate the energy of the laterally shifting boom and suppress the oscillation. Referring to the dampening device shown in detail associated with upper connection 48, it should be noted that the axle formed by the carriage bolt 80 rotates with the hanger leg 56, whereas the tubular member 78 is fixed in relation to the frame of the vehicle. The resilient bushing 86 presents a sleeve that fills the annular cavity between the inner surface of the tubular member 78 and the outer surface of the intermediate portion of the axle or bolt 80 within the member 78. Although dimensioned to provide a press fit during initial assembly, as explained hereinabove the nuts 84 are tightened to subject the bushing 86 to high axial compression sufficient to form pronounced annuluses 92 at each end. The result is that the bushing 86 is forced radially outwardly and inwardly into frictional engagement with the inner surface of tubular member 78 and the outer surface of the intermediate portion of the axle 80. Therefore, since the axle 80 rotates as hanger leg 56 swings, such swinging movement is resisted by the highly compressed, stationary bushing 86 within the tubular member 78. The result is that oscillation of the boom is suppressed due to the absorption of the energy by the bushing 86.

Boom oscillation is effectively controlled since the dampening devices of the present invention are incorporated into all four of the pivotal connections 46, 48, 52 and 58. The only structural difference between the upper and lower connections is that the tubular member 78 at each lower connection is rigid with the cross piece 54 or 60 of the center portion 24 of the boom rather than being fixed to the support bar 40. This may be seen at the bottom of FIG. 4 for lower connection 58, where the ends of the tubular member 78 are shown projecting forwardly and rearwardly from the cross piece 60. Accordingly, dampening is effected at all of the connection points of the linkage.

Having thus described the invention, what is claimed as new and desired to be secured by Letters Patent is:

1. In a vehicle provided with a boom assembly that extends laterally therefrom during use, a self-leveling mount for said assembly comprising:
   support structure on said vehicle,
   a pair of laterally spaced hanger legs depending from said structure, each hanger leg including a pair of spaced leg components,
   a central portion of said boom assembly beneath said structure carried by said legs,
   upper connection means attaching each of said legs to said support structure for pivotal movement about respective laterally spaced, upper axes extending fore-and-aft of said vehicle,
   lower connection means attaching said central portion of the boom assembly to said legs for relative movement of said legs and assembly about a pair of laterally spaced, lower axes extending fore-and-aft of said vehicle, and
   at least one of said connection means including a tubular member substantially coaxial with a corresponding axis, an axle in said tubular member having a pair of end portions and an intermediate portion therebetween and movable with the associated leg, a resilient bushing having a pair of opposed and axially spaced ends in the tubular member and surrounding the intermediate portion of the axle, and a pair of pressure elements disposed between the associated leg components and corresponding ends of the bushing, and compression means for causing the pressure elements to subject the bushing to axial compression to force the bushing radially outwardly and inwardly into frictional engagement with an inner surface of the tubular member and an outer surface of the axle therein, to suppress oscillation of the boom assembly when the hanger legs swing in response to movement of the vehicle.

2. The mount as claimed in claim 1, wherein said tubular member has a length less than the distance between said ends of the bushing, and wherein each of said bushing ends presents an expanded annulus engaged by a corresponding pressure element.

3. The vehicle of claim 1 wherein both the upper and lower connection means include a tubular member, axle, resilient bushing, pair of pressure elements and compression means.

4. The vehicle of claim 1 wherein the compression means includes a head on one end of the axle and a threaded nut on the opposite end, for axially forcing the pressure elements into engagement with the resilient bushing.

5. In a vehicle provided with a boom assembly that extends laterally therefrom during use, a self-leveling mount for said assembly comprising:
   support structure on said vehicle,
   a pair of laterally spaced hanger legs depending from said structure,
   a central portion of said boom assembly beneath said structure carried by said legs,
   upper connection means attaching each of said legs to said structure for pivotal movement about respective laterally spaced, upper axes extending fore-and-aft of said vehicle,
   lower connection means attaching said central portion of the boom assembly to said legs for relative movement of said legs and assembly about a pair of laterally spaced, lower axes extending fore-and-aft of said vehicle,
   each of said connecting means including a pair of dampening devices each having a tubular member substantially coaxial with a corresponding axis, an axle in said member movable with the associated leg, a resilient bushing in said member around said axle, and means subjecting said bushing to axial compression to force said bushing radially outwardly and inwardly into frictional engagement with an inner surface of said member and an outer surface of said axle therein, and
   means rigidly securing the tubular members of the upper connecting means to said structure, and rigidly securing the tubular members of the lower connecting means to said central portion, whereby to suppress oscillation of said boom assembly when the hanger legs swing in response to movement of the vehicle over uneven terrain.

6. The mount as claimed in claim 5, wherein said bushing of each dampening device has a pair of opposed, axially spaced ends, and wherein said subjecting means includes means on said axle engaging said ends.

7. The mount as claimed in claim 5, wherein said axle of each dampening device has a pair of end portions and an intermediate portion therebetween, and wherein said bushing of each dampening device surrounds said intermediate portion and has a pair of opposed, axially spaced ends, said subjecting means including a pair of pressure elements on respective end portions of the axle engaging said ends of the bushing.

8. The mount as claimed in claim 7, wherein said tubular member of each dampening device has a length less than the distance between said ends of the bushing, and wherein each of said bushing ends presents an expanded annulus engaged by a corresponding pressure element.

9. The mount as claimed in claim 7, wherein each of said legs includes a pair of leg components on respective end portions of corresponding axles, said pressure elements of each device being disposed between the respective leg components and corresponding ends of the associated bushing.

10. A mount for movably mounting a boom assembly to a vehicle, including:
   a vehicle mounting portion on the vehicle,
   a boom assembly mounting portion on the boom assembly,
   hanger leg means having first and second ends and a pair of spaced leg components at each end,
   first pivot means for pivotally mounting the first end of the hanger leg means to the vehicle mounting portion,
   second pivot means for pivotally mounting the second end of the hanger leg means to the boom assembly mounting portion, and
   at least one of the first and second pivot means including:
      a tubular member mounted to the mounting portion,
      an axle extending between the leg components of the hanger leg means and through the tubular member,
      a resilient bushing having opposite ends, within the tubular member, and around and in surface contact with the axle,
      a pair of pressure elements disposed between the associated leg components and corresponding ends of the bushing, and
      compression means for causing the pressure elements to compress the resilient bushing and force the bushing radially into frictional engagement with the axle and tubular member, to suppress oscillation of the boom assembly with respect to the vehicle.

11. The mount of claim 10 wherein the axle has a pair of end portions and an intermediate portion therebetween, and wherein the resilient bushing surrounds the intermediate portion and has a pair of opposed, axially spaced ends, the pair of pressure elements on respective end portions of the axle engaging the ends of the bushings.

12. The mount of claim 11 wherein the tubular member has a length less than the distance between the ends of the resilient bushing, and wherein the bushing ends present an expanded annulus engaged by corresponding pressure elements.

13. The mount of claim 10 wherein both the first and second pivot means include a tubular member, axle, resilient bushing, pair of pressure elements and compression means.

14. The vehicle of claim 10 wherein the compression means includes a head on one end of the axle and a threaded nut on the opposite end, for axially forcing the pressure elements into engagement with the resilient bushing.

* * * * *

UNITED STATES PATENT AND TRADEMARK OFFICE
CERTIFICATE OF CORRECTION

PATENT NO. : 4,834,249

DATED : May 30, 1989

INVENTOR(S) : Dennis A. Dahl

It is certified that error appears in the above-identified patent and that said Letters Patent is hereby corrected as shown below:

Column 8, lines 21-22, delete "bushings", insert --bushing--.

Signed and Sealed this

Twenty-sixth Day of June, 1990

Attest:

HARRY F. MANBECK, JR.

*Attesting Officer*  *Commissioner of Patents and Trademarks*